United States Patent [19]

Seats

[11] Patent Number: 4,827,182

[45] Date of Patent: May 2, 1989

[54] CRT WITH ELONGATED ENVELOPE HAVING NON-COAXIAL PORTIONS

[75] Inventor: Peter Seats, Boonton, N.J.

[73] Assignee: Thomson Electron Tubes and Devices Corporation, Dover, N.J.

[21] Appl. No.: 151,437

[22] Filed: Feb. 2, 1988

[51] Int. Cl.$^4$ .................... H01J 29/86; H01J 29/76
[52] U.S. Cl. ................................. 313/431; 313/495; 313/477 R; 313/475
[58] Field of Search ............. 313/477 R, 495, 419, 313/372, 475, 431, 432 (U.S. only); 358/901

[56] References Cited

U.S. PATENT DOCUMENTS

| | | | |
|---|---|---|---|
| 2,244,748 | 6/1941 | Walker | 313/432 |
| 2,657,257 | 10/1953 | Lesti | 313/433 |
| 2,880,341 | 3/1959 | Aiken et al. | 313/422 |
| 2,975,230 | 3/1961 | Schlesinger | 313/471 X |
| 3,609,233 | 9/1971 | Nagao | 313/372 X |

FOREIGN PATENT DOCUMENTS 792021 3/1958 United Kingdom ............... 313/495

Primary Examiner—Palmer C. DeMeo
Attorney, Agent, or Firm—Roland Plottel

[57] ABSTRACT

A cathode ray tube useful as a transducer in a recording system is provided with a cylindrical envelope whose length is much longer than its width. An electron gun at one end of the envelope provides an electron beam directed for flow along the longitudinal axis of the envelope. A fiber optics faceplate is positioned to extend longitudinally in a sidewall of the envelope. The inner surface of the faceplate is coated with an electron-sensitive coating and the outer surface is positioned in contact with a recording medium. An array of electromagnets are positioned along the envelope and when energized the electron beam is deflected for repetitive linear scan of the faceplate. For relaxing the requirements of the deflecting system, various techniques are described, including modification of the tube envelope.

5 Claims, 3 Drawing Sheets

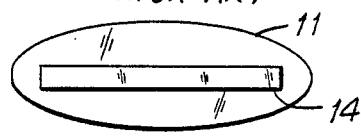
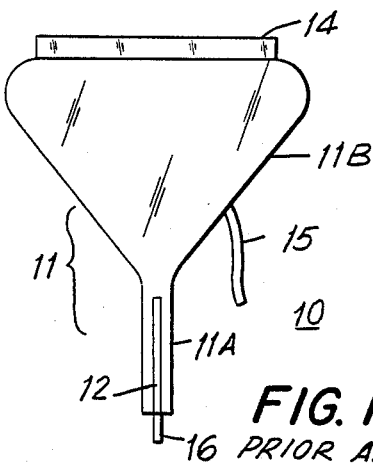
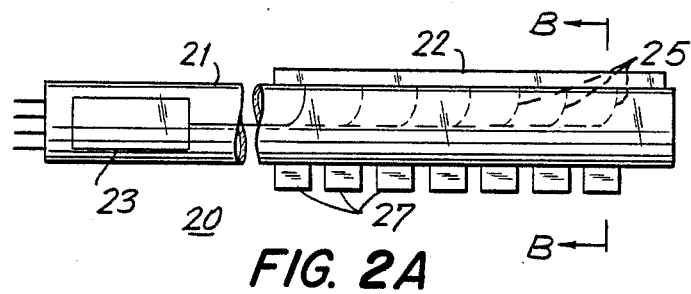
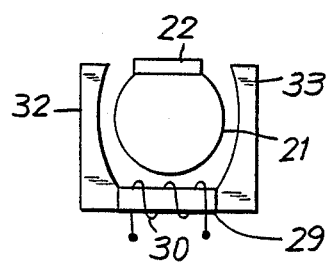

FIG. 5A
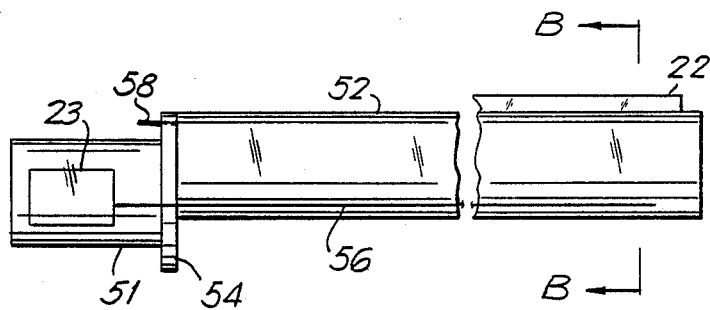
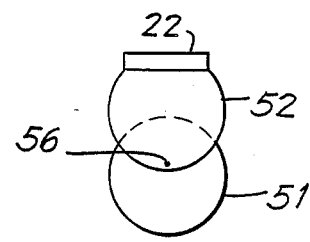
FIG. 5B

CRT WITH ELONGATED ENVELOPE HAVING NON-COAXIAL PORTIONS

FIELD OF THE INVENTION

This invention relates to a cathode ray tube (CRT) useful for providing signal information to a recording medium, and more particularly to a CRT that is especially configured for scanning essentially along a linear region much narrower than the scan length, to be described as a line scan.

BACKGROUND OF THE INVENTION

Line scan CRTs are presently important in photorecording applications. Such tubes typically incorporate a narrow plate of glass fiber optics sealed to the output end of the conventional funnel-shaped envelope and in operation a line-at-a-time video-modulated electron beam is deflected or swept across the phosphor-coated inside surface of the fiber optics plate. Modulated light resulting from electrons incident on a phosphor passes through the fiber optics plate and is made incident onto the surface of a photosensitive recording medium that is placed in contact with the outer surface of the fiber optics plate. Line scans are repeated as the medium is moved past the plate in synchronism by means of a stepping motor or continuous drive mechanism attached to a roll or sheet of the medium. Normally, the beam scan is essentially only in the horizontal or (X) direction with the medium moving in the vertical or (Y) direction. Minor modulation of the beam in the (X) direction is usually included to extend the life of the phosphor. As the scans continue and the medium moves, an X-Y image is produced on the photosensitive medium that is subsequently developed and fixed in various ways appropriate to the nature of the medium employed.

The use of a fiber optics plate on the output surface of the CRT simplifies the imaging system since the fiber optics collimates the phosphor light, and makes feasible image formation by direct contact to the medium. This desirably makes for compactness in the recorder, by eliminating the conventional lens-type optical system. However, the length and bulk of the CRT itself still militates against achieving a highly compact assembly. Further, while there have been attempts to substitute solid state devices for the CRT, this proves impractical for recorders designed for wide high quality images, for example images as much as fourteen inches wide.

To avoid this problem, the present invention provides a CRT of novel design that makes for increased compactness.

SUMMARY OF THE INVENTION

A CRT in accordance with the invention utilizes an envelope that is long but narrow resembling more the envelope of the familiar household fluorescent tube than the funnel-shaped envelope of a conventional CRT. Moreover, the fiber optic plate is positioned along the side of the tube rather than across the end of the tube. Then advantageously an array of electromagnets is located along the tube and is used to deflect the electron beam magnetically from its normal direction along the envelope axis transversely to be incident on the fiber optic plate along the side of the envelope. By appropriately energizing the successive electromagnets of the array, the electron beam is made to sweep along or scan repetitively the length of the fiber optic plate.

Moreover, to improve efficiency and increase compactness of the electromagnet deflection structure, various strategems can be employed. In the preferred embodiment of the invention, the tube envelope is of a novel design that provides for the electron beam a path therethrough that is displaced from the envelope axis along the region of deflection. Alternatively, electrostatic deflection can be used for redirecting the electron beam for linear scan of the sidewall faceplate.

The invention will be better understood from the following more detailed description taken in conjunction with the accompanying drawing.

BRIEF DESCRIPTION OF THE DRAWING

FIGS. 1A and 1B are end and side views of a conventional CRT for use in a line-scan recorder.

FIG. 2A is a longitudinal section of a CRT in accordance with an illustrative embodiment of the invention taken along the tube axis, and FIB. 2B is a sectional view taken along the line BB of FIG. 2A and shows the structure of one of the electromagnets of the array used for deflecting the electron beam transversely for incidence on the fiber optic plate.

FIG. 5A is a longitudinal section of the preferred embodiment of the invention, and FIG. 5B is a section taken along the line BB of FIG. 5A.

DESCRIPTION OF THE INVENTION

Figure 3:
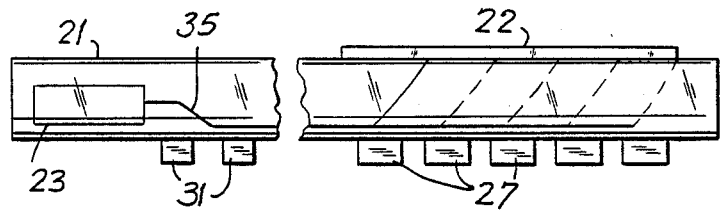
FIG. 3 is a longitudinal section of a CRT in accordance with an alternative embodiment of the invention.

FIGS. 1A and 1B show the conventional form of CRT used in line scan recorders. It includes a funnel-shaped envelope 11, typically of glass, that includes an elongated neck portion 11A that houses the electron gun 12, and a flaring portion 11B that widens to provide an output end of enlarged width that accommodates the fiber optic faceplate 14. The surface of the faceplate inside the envelope is coated with a suitable phosphor that is sensitive to the incident electrons. Light excited at this inner surface by the incident electrons is transmitted via the fibers to the outside surface of the faceplate where it is used to create an image in the photosensitive medium (not shown) as it is moved past the faceplate.

Typically, the inside sidewalls of the envelope are coated with a conductive film that is maintained at a suitable high d-c potential by way of lead 15 for accelerating the electrons for incidence on the faceplate.

The electron gun 12 in the neck of the tube is designed to shape the electrons emitted into a beam and accelerate the beam towards the faceplate. Deflection coils (not shown) positioned around the flare of the envelope and supplied with appropriate currents are used to sweep the electron beam repetitively linearly across the faceplate. A control grid in the electron gun is used to modulate the electron beam in accordance with signal information to be recorded. The various operating voltages needed for the electron gun are supplied by way of the pins 16 at the neck end of the tube.

It can be appreciated that this tube design is relatively bulky, the bulk largely resulting from the flaring portion 11B of the envelope of the tube.

In the present invention, a reduction in bulk is achieved by substantially eliminating the flared portion of the envelope and by locating the fiber optic plate along a sidewall of the unflared envelope.

FIGS. 2A and 2B illustrate the simplest form of a cathode ray tube 20 in accordance with the invention. The tube envelope 21 is a simple elongated cylinder of essentially circular cross section along substantially its entire length. Typically this cylinder may be about one and a half inches in diameter and about twenty inches in length to accommodate a fiber optic plate 22 of about fourteen inches that extends along a sidewall. One end of the tube includes the electron gun 23 that may be basically of conventional design. Typically it may be designed to form an electron beam of circular cross section, initially about twenty-five mils diameter, and to focus or converge this beam to a diameter of several mils at its focal point. Moreover, it will be advantageous to include provision in the electron gun for varying the focal point electronically along the tube for reasons to be discussed subsequently.

The fiber optic faceplate 22 is positioned in a sidewall of the envelope primarily along the downstream half of the tube. In the usual fashion, the faceplate surface inside the envelope is coated with a phosphor while the surface outside the envelope is adapted to contact the recording medium. The fiber optic plate typically is about fourteen inches long and about a half-inch wide of fused fibers each about ten to fifteen microns in diameter, and the beam incident on the strip typically has a diameter of between two and three mils. Provision is made for periodically perturbing the beam in the width direction of the strip by several mils, as it sweeps along the length of the fiber, to avoid excessive aging of the phosphor by repetitive traces along the exact same path. The movement of the recording medium advantageously is sufficiently slow relative to the speed of the scan to permit several repetitive scans of the same information on the strip to improve the signal-to-noise ratio based on the familiar principle that the noise will add a random basis while the signal will add cumulatively. Additionally, multiple scans with a slight perturbation will provide a desirable averaging effect that will reduce granularity and streaking.

Additionally, the CRT is provided with a plurality of electromagnets 27 aligned in a linear array essentially along the same portion of the envelope that includes the faceplate 22. Each of these electromagnets is designed so that when energized it will deflect the electron beam going therepast from its axial direction to a transverse direction for incidence on the portion of the faceplate alongside it. The electromagnets of the array are energized in turn so that the electron beam is deflected appropriately to scan the linear strip of optical fibers continuously from one end to the other at a smooth and uniform rate.

As is known, the degree of deflection will depend both on the strength of the magnetic deflecting field, the velocity of the electrons in the beam at the time of deflection, and the distance the electrons go after deflection before incidence on their target.

It is generally most convenient to vary the strength of the deflecting field by varying the current supplied to the coils of the electromagnets. To this end, the deflecting array is driven by a power supply that provides on a cyclic basis a series of wave forms which are supplied in turn to the coils of the successive electromagnets of the array, so that each electromagnet is energized in turn. Moreover, each of the pulses has an amplitude that gradually decreases with time so that the deflecting radius similarly decreases to provide a sweeping action.

Typically each electromagnet can be used to control a length of about one and one-eighth inches of the strip, so that for a strip fourteen inches long, about fifteen electromagnets should be assembled in an array, including two or three to establish the beginning of the deflecting field.

In FIG. 2B there is seen in detail the basic structure of an individual electromagnet 27 of the array. It includes a core portion 29 about which is wound a coil 30 to which is supplied an energizing current. Pole pieces 32 and 33, extending from opposite ends of the core 29 on opposite sides of the envelope 21, create a magnetic field that extends transversely across the envelope so that an electron beam flowing axially inside the envelope is deflected in a direction transverse to that flow and transverse to the magnetic lines, for incidence on the faceplate 22 in the sidewall portion of the envelope equidistant from the two pole pieces as shown by lines 25. It is, of course, unnecessary that the beam be deflected at a ninety degree angle and typically the deflection angle will be between thirty and sixty degrees because of the shortness of the region over which the deflecting field acts.

It is advantageous that the scan of the faceplate by the beam be relatively smooth. However, a variety of scanning patterns are feasible.

For example, for each scan the beam may be deflected in turn by successive electromagnets in the downstream direction of the electron flow, i.e., a line scan begins by deflection first by the upmost electromagnet (i.e., the one closest to the electron gun). In this case for unidirectional scan by successive electromagnets, the degree of deflection introduced by any particular electromagnet needs to peak at the time such electromagnet takes over and to gradually reduce until the succeeding electromagnet takes over. This requires that the magnetizing current supplied to an individual coil have a pulse waveform which peaks at its leading edge and gradually reduces to its trailing edge.

Alternatively, by appropriately processing the input signal applied to the CRT, there may be utilized a deflection arrangement in which the line scan moves in the direction opposite that of the electron flow. In this case, each line scan begins by deflection of the beam by the downmost electromagnet and is continued by deflection by its upstream neighbor. In this case, for a time-continuous unidirectional scan, the waveform of the magnetizing current to each coil should be a pulse whose amplitude increases between its leading the trailing edge.

Moreover, it should be evident that by appropriate processing of the signal information before it is applied to the CRT for recording, a scanning pattern may be utilized in which the line scan comprises a succession of scans each in a given direction, either the same or opposite that of the beam, but the scan provided by successive electromagnets is not continuous with time in that each scan does not begin in time at the point in space where the preceding scan ended. With such a signal, it is feasible to begin the scan with the upmost electromagnet and to supply a magnetizing current to each coil of pulses whose amplitude increases from its leading to trailing edge.

For optimum reproduction quality, it is important that the electron beam be sharply focused as it is swept along the faceplate. To this end, it is desirable that the electron beam be focused at the time that it is deflected. Since the path length of the beam from its source to the point of deflection is varying with time, it is advantageous to adjust the focus voltage continuously for optimum focus as a function of the beam deflection location. This technique, termed dynamic focusing, is well known in the art. However, it is also known that dynamic focusing typically provides a focused spot size that increases with increasing distance away from the source. For optimum reproduction quality, it is important to use a scanning spot of relatively uniform size and independent of the position along the faceplate.

To this end, it is advantageous to apply a second correction to the dynamic focusing to adjust the focused spot size. This can be achieved with an offsetting defocusing waveform superimposed on the dynamic focus voltage, or by rapidly perturbing transversely the electron beam slightly, the amplitude of the perturbation decreasing with increasing distance from the source end to compensate for the increasing focused spot size with increasing distance along the beam path.

In the embodiment just described, at the time of deflection, the beam is essentially centered along the axis of the envelope. This results in some inefficiency since little use is made for deflection of the radial separation of the beam from the envelope. A more efficient configuration is one in which the electron beam at the time of deflection is located proximate the core portion of each electromagnet.

FIG. 3 illustrates one technique to this end. A pair of electromagnets 31 are located just beyond the electron gun along the envelope, and they are used to displace the electron beam, that is launched initially in a direction along the central longitudinal axis of the envelope, for flow along a longitudinal path located near the bottom of the envelope as shown by the line 35 close to the core portions of the electromagnets. By so relocating the beam, it is apparent that there is increased effectively the distance over which the beam may be deflected before it is incident on the faceplate, thereby reducing the radius of the deflection needed and the strength of the magnetic field needed for the deflection. This similarly reduces the amount of energizing current needed to be supplied by the electromagnet.

Figure 4A:
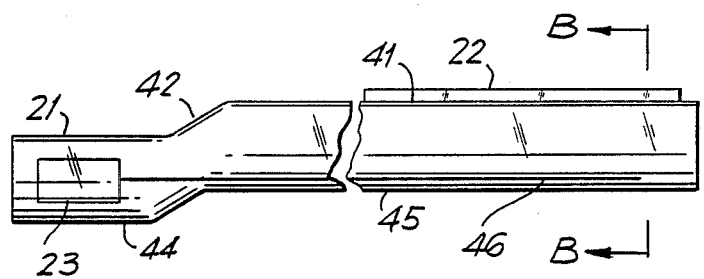
FIG. 4A is a longitudinal section of another embodiment of the invention.
Figure 4B:
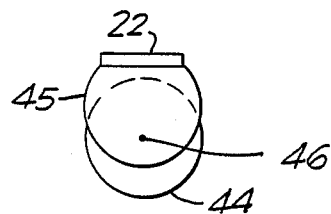
FIG. 4B is a section taken along line BB of FIG. 4A.

An alternative technique illustrated in the embodiment shown in FIGS. 4A and 4B is to distort axial symmetry of envelope 41 by inclusion of the bend 42 in the envelope which divides the envelope into two sections 44 and 45 whose central axes are displaced, so that the beam, although not displaced in direction, will nevertheless proceed on a path close to the bottom of the envelope in the region opposite the faceplate, although initially launched on a path along the central axis of the gun end of the envelope. In this figure, the electromagnets have not been shown to simplify the drawing.

A related technique for effectively increasing the length of the deflection path available would include increasing the diameter of the envelope. This requires longer or larger magnetic pole pieces and consequently undesirably enlarges the entire assembly.

A preferred technique is illustrated in FIGS. 5A and 5B. In this case, the envelope is made in two separate cylindrical circular sections 51, 52, each of which is fused to a transition section 54 and aligned to provide an effective step in the resulting envelope whereby the electron beam flows along the path shown by the solid line 56. Accurate assembly in the desired alignment is readily achieved by facing the ends of the two sections on a 90 degree glass grinder and by providing a precision jig to hold the two parts in the designed alignment during the sealing steps.

As an added advantage of this geometry, the high voltage connection 58 to the conductive coating included in the inside walls of the envelope used for accelerating the beam can be brought out, as shown, near the transition 54.

It should be apparent that envelopes of other cross-sections can be used, for example, V-shaped or U-shaped, so that most of the cross-section can be used for deflection of the beam.

Additionally, while the emphasis has been on magnetic deflection of the electron beam, electrostatic deflection can be used to provide the transverse deflection for incidence on the sidewall faceplate. This technique would utilize an array of electrodes disposed along the tube envelope to which are applied in turn voltages appropriate for bending the electron beam electrostatically in a manner analogous to the magnetostatic deflection described above.

What is claimed:

1. A cathode ray tube comprising means forming an elongated envelope, means at one end of the envelope for forming an electron beam and launching the beam along a first path in the envelope in a first direction, electron-sensitive means disposed along a sidewall of the envelope and having a relatively long path displaced from the first path but substantially parallel to the first direction, means disposed along a major portion of the first beam path for surrounding the electron beam for deflecting the electron beam transversely from the first direction for sweeping the beam along the length of the electron sensitive means for incidence thereon, and means for modulating the electron beam in accordance with signal information for modulating the number of electrons incident along the length of the electron sensitive means in accordance with said signal information, wherein the envelope includes a first portion coaxial with the electron beam as launched and a second portion whose axis is not coaxial with the electron beam as launched.

2. A cathode ray tube in accordance with claim 1 in which the envelope includes a pair of circular cylinders whose central axes are parallel but transversely displaced, the beam forming means being in one of the two cylinders and the electron sensitive means being in the sidewall of the other of the two cylinders.

3. A cathode ray tube in accordance with claim 2 in which the two cylinders are sealed on opposite sides of a transition section.

4. A cathode ray tube in accordance with claim 3 in which the envelope includes a conductive coating along its inner walls and a conductive connection to said coating passes through the envelope near said transition section.

5. A cathode ray tube in accordance with either claim 1, 2, 3 or 4 in which the means for deflecting the beam transversely is an array of electromagnets for magnetic deflection of the beam.

* * * * *